June 16, 1931.  W. DIETER  1,810,644
LOCK WASHER
Filed Sept. 10, 1926
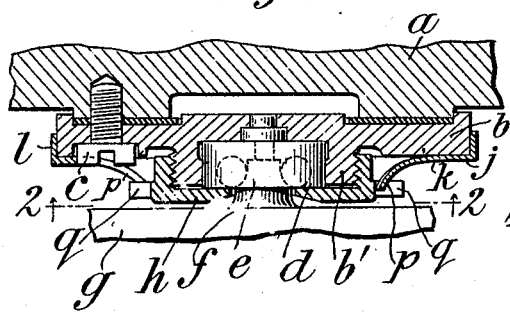
Fig. 1.
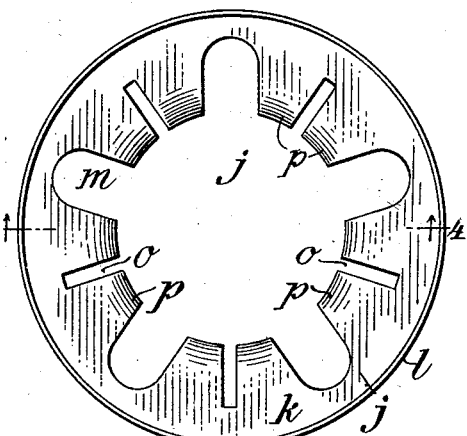
Fig. 3.
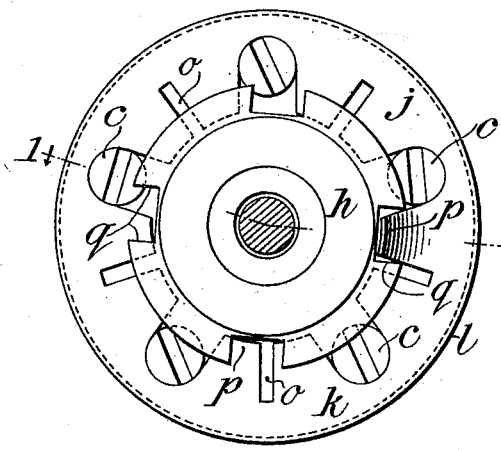
Fig. 2.
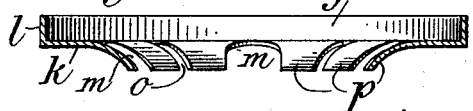
Fig. 4.
Fig. 5.
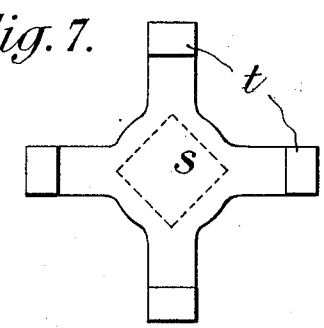
Fig. 7.
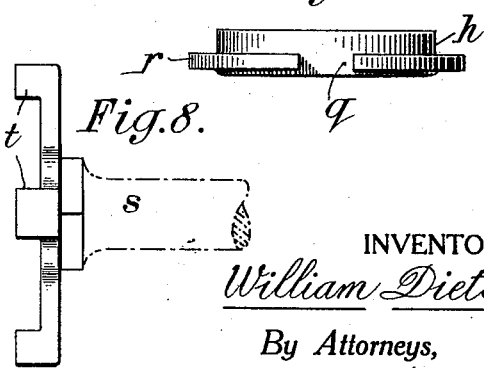
Fig. 6.
Fig. 8.
INVENTOR:
William Dieter,
By Attorneys,
Fraser, Myers & Manley Patented June 16, 1931

1,810,644

UNITED STATES PATENT OFFICE

WILLIAM DIETER, OF NEWARK, NEW JERSEY, ASSIGNOR TO E. W. BLISS COMPANY, OF BROOKLYN, NEW YORK, A CORPORATION OF DELAWARE

LOCK WASHER

Application filed September 10, 1926. Serial No. 134,653.

This invention relates to locking means for fastening a screw or nut in various adjusted positions. It is especially adapted to those cases where the screw or nut is not tightened but requires to be turned to a set adjustment, and thereupon held against movement in either direction.

The nature of the invention will be made apparent as the description proceeds.

In the drawings the invention is shown as applied to an adjustable member of a ball bearing, this being one suitable embodiment.

Figure 1 shows the structure in vertical diametrical section in the plane of the line 1—1 in Fig. 2.

Fig. 2 is a transverse section looking upward in Fig. 1 on the plane of the line 2—2.

Fig. 3 is a plan of the lock washer.

Fig. 4 is a transverse section thereof on the line 4—4 in Fig. 3.

Fig. 5 is an inverted plan of the screw or nut to be locked.

Fig. 6 is a side elevation of the latter.

Fig. 7 is a plan of a key or wrench to be used for adjusting the parts.

Fig. 8 is a side elevation thereof.

In Fig. 1 let $a$ designate any suitable support against which a bearing member $b$ is fastened suitably, as by screws $c\ c$. This bearing member encloses or holds within it the socket member $d$ of the ball bearing, the cone $e$ of which is formed upon a projection $f$ from a movable part $g$, which latter is the pivoted member for the pivotal support of which the ball bearing is provided. It may be assumed that underneath the bearing shown in Fig. 1 is a similar, but relatively inverted ball bearing.

The socket member $d$ is held in its recess within the bearing member $b$ by means of an adjustable screw or nut $h$, which is shown separately in Figs. 5 and 6. This part $h$ has a threaded engagement with a neck portion $b'$ of the bearing member $b$, so that by its adjustment up or down it may adjust the bearing by lifting or lowering the bearing cup, or it may merely clamp the parts in place.

To hold the adjusting member $h$ in its adjusted position, the present invention provides a lock washer $j$, which is shown as constructed of a flat plate having an outer annular portion $k$ and an outer flange $l$, with recesses $m\ m$, and with radial slots or incisions $o\ o$ whereby are formed a series of spring-tongues $p\ p$, the free ends of which are disposed normally in a plane spaced from and parallel with the plane of the portion $k$.

The adjusting member $h$ is formed with a series of notches $q\ q$, any one of which is adapted to be entered by any one of the spring-tongues $p\ p$. These notches are conveniently formed in a flange $r$, and their number is such that only one of them can be entered at any one time by one of the tongues $p$. As shown, there are four notches $q$ and ten tongues $p$ arranged in five pairs. Any other suitably differentiated numbers might be employed, as, for example, five and six, six and seven, etc., the principle being analogous to that of a vernier.

The tongues $p\ p$ are curved downwardly and tend to enter the notches $q\ q$. To prevent them from entering prematurely or while the member $h$ is being turned to adjust it, it is desirable to use a special tool for making this adjustment, that is to say, a wrench or key having projections coinciding with the notches $q\ q$. Such a key is shown in plan in Fig. 7 where the key is designated by $s$, and it has a suitable head or arms carrying projections $t\ t$ of just the required size and depth to fill the notches $q\ q$ and come at least flush with the upper face of the flange $r$, so that when this key is applied, the tongues $p\ p$ are held pressed up out of these notches, and the adjustable member $h$ may be turned to any desired position. In any adjustment to which the member $h$ is turntd one of its notches will coincide, or very nearly so, with one of the tongues $p$, and a very slight or negligible turn of the part $h$ will bring about an exact coincidence with one of the tongues $p$, which will enter the notch as shown in Fig. 2. Thus, the adjusting member is held securely against any possible displacement. The key $s$ is suitably shaped to reach the member $h$ whatever may be its position,—that is, however inaccessible its location may be. The stem shown in dotted lines in Fig. 8 is an example merely of one possible construction.

It is necessary to hold the lock washer *j* against turning, and this is conveniently accomplished by forming its recesses *m m* to coincide with the positions of the screws *c c* so that these screws hold it against rotary displacement. It is held up in engagement with these screws by the bearing of all but one of its tongues *p* against the top of the flange *r*.

It will be understood that at the time when the screw member *h* is being turned, the mounted or pivotal part *g* is removed so as not to be in the way of the use of the key *s*.

The invention is subjected to some variance in construction according to the different locations to which it may be required to be adapted. It is understood that the invention may be modified within the scope of the appended claims.

It will be understood that the adjustable screw or nut *h* is a typical example of a screw member or rotative part requiring rotative adjustment and requiring to be held in any adjusted position; and that the lock washer *j* with its spring tongues *p* is a typical example of a locking part adapted to interlock with and hold said rotative member; and that the essential relation of these two parts is that one of them has a plurality of radially spaced notches *q* or other form of recesses, and the other has radially spaced locking projections, any one of which may enter any one of the recesses; and that the spacing of the recesses and locking projections must be according to diverse radial arrangements, so that in any given series of these co-acting elements only one projection may enter only one recess in any one of the positions of rotative adjustment in which the locking action is to occur; thus, one of the series may be of a given number (say four, for example) while the other series should be of the next higher number (say five, for example), or in either instance a multiple of the given number (say ten, for example) may be chosen. This permits of locking at a multiplicity of radial positions very slightly removed from one another so as to give practically a universal adjustment.

What I claim is:

1. In combination with a member having a threaded neck and a nut engaged thereon having a plurality of notches, a lock washer having a plane portion and a plurality of spring tongues extending from the plane portion having their free ends disposed normally in a plane different from and parallel with that of the plane portion, certain of the tongues engaging the nut to urge the plane portion of the washer to seat against the member, and one of the tongues being received through one of the notches to lock the nut against rotation on the threaded neck.

2. In combination with a member having a threaded neck and a nut engaged thereon having a peripheral flange and provided with a plurality of notches, a lock washer having an outer annular portion and a plurality of spring tongues extending radially from the annular portion having their free ends disposed normally in a plane parallel with that of the annular portion, certain of the tongues engaging against the flange to urge the annular portion of the washer to seat against the member, and one of the tongues being received through one of the notches to lock the nut against rotation on the threaded neck.

3. In combination with a member having a threaded neck and a nut engaged thereon having a peripheral flange and provided with a plurality of notches, a lock washer having an outer annular portion and a plurality of spring tongues extending radially inwardly from the annular portion having their free ends disposed normally in a plane spaced from and parallel with that of the annular portion, certain of the tongues engaging against the flange to urge the annular portion of the washer to seat against the member, and one of the tongues being received through one of the notches to lock the nut in adjusted positions against rotation in either direction on the threaded neck.

4. The combination claimed in claim 2, in which the annular portion of the washer is provided with a recess and in which a projection extends from the face of the member against which the annular portion of the washer seats, said projection being received in said recess to secure the washer against rotation relatively to the member.

5. The combination claimed in claim 2, in which a fastening element secures the member to a support, the head of the fastening element projecting from the face of the member against which the annular portion of the washer seats, and in which the annular portion of the washer is provided with a recess receiving said head to secure the washer against rotation relatively to the member.

In witness whereof, I have hereunto signed my name.

WILLIAM DIETER.